May 8, 1934.   E. P. RENAUX   1,957,668
AXIALLY MOVABLE BRAKE SERVO
Filed July 9, 1928
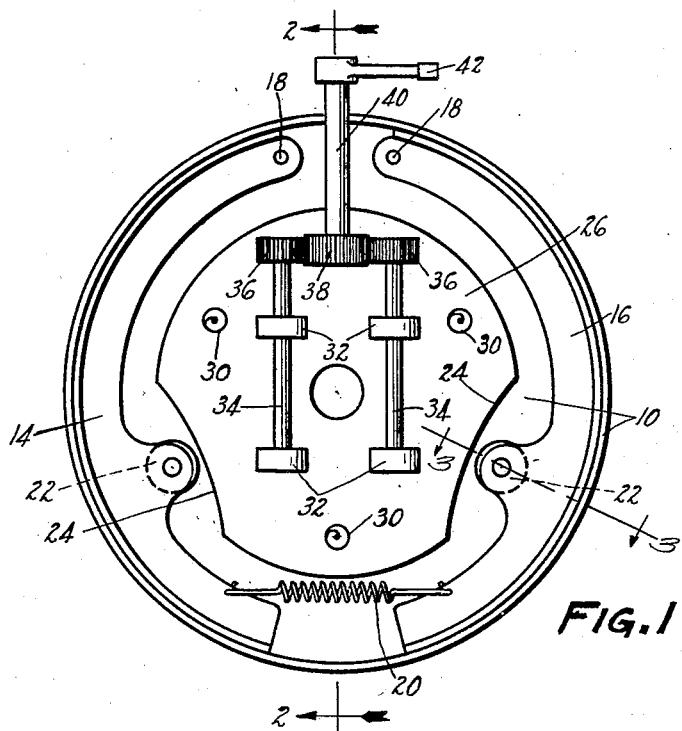
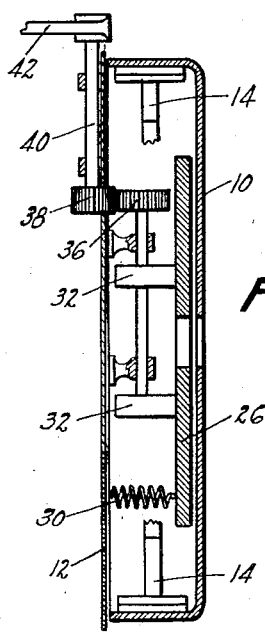
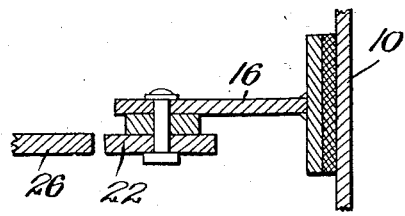
INVENTOR
EUGENE P. RENAUX
BY
*m.w. m^cConkey*
ATTORNEY Patented May 8, 1934

1,957,668

UNITED STATES PATENT OFFICE 1,957,668

AXIALLY MOVABLE BRAKE SERVO

Eugène Prosper Renaux, Paris, France, assignor to Bendix Brake Company, South Bend, Ind., a corporation of Ilinois Application July 9, 1928, Serial No. 291,290
In France June 8, 1922

6 Claims. (Cl. 188—78)

This invention relates to brakes, and is illustrated as embodied in a drum type brake suitable for use on an automobile wheel.

An important object of the invention is to provide a compact but powerful servo mechanism for applying the brake, by arranging a novel axially-movable friction device and an expansible and contractable friction device, preferably engaging the same drum, in such a manner that one operates the other.

According to an important feature of the invention, both friction devices are arranged within the drum, so that the whole brake is enclosed. In a very desirable arrangement, an axially-movable servo member is rocked by the braking friction to wedge apart a pair of anchored shoes or other friction means engaging the outer flange of the brake drum. For example, the servo member may have wedges engaging rollers carried by the shoes.

The axially-movable friction means and the expansible and contractable friction means embody in their construction, independently of their use in combination, several features of novelty which will be apparent from the following description of one illustrative embodiment of the invention shown in the accompanying drawing, in which:

Figure 1 is a side elevation of the brake, with the backing plate removed, showing the relative arrangement of the shoes and the servo member;

Figure 2 is a vertical section through the brake, on the line 2—2 of Figure 1; and Figure 3 is a partial section on the line 3—3 of Figure 1.

In the particular brake selected for illustration, all of the friction parts are arranged inside of a drum 10 having a head and a peripheral cylindrical braking flange, and which is intended to rotate with a wheel. At the open side of the drum is arranged a backing plate 12, omitted in Figure 1 and broken away in Figure 2.

The expansible and contractible friction means is shown as a pair of shoes 14 and 16, anchored at their adjacent ends on backing plate 12 on pivots 18, and urged away from the peripheral flange of drum 10 by a tension spring 20 connecting their unanchored ends. The shoes have rollers, or equivalent parts, 22 which are engaged by wedge surfaces 24 on opposite edges of an axially movable friction member, such as a disk 26, which is preferably movable into engagement with the head of drum 10.

For convenience of illustration, shoes 14 and 16 are shown in their "on" positions, in engagement with drum 10, while disk 26 is shown in "off" or initial position, so that rollers 22 do not actually engage wedge surfaces 24 in Figure 1, although in practice they are at all times in engagement with the disk.

Disk 26 is urged away from the head of the drum by suitable means, such as a plurality of tension springs 30 spaced angularly about the axis of the drum and connected to the backing plate 12. The disk 26 shown in the drawing is centrally perforated to be pivoted on the spindle for a front wheel carrying drum 10.

Disk 26 is forced axially against the head of the drum by cams or other applying devices 32, distributed equally angularly about the axis of the drum, and carried in spaced relation on a pair of rockshafts 34 inter-connected by means such as a pair of pinions 36 meshing with an operating pinion 38 on an operating shaft 40 rocked by an arm 42. Shafts 34 and 40 may be journalled in any suitable supports, not shown, for example bearings carried by the backing plate 12.

Rocking arm 42 turns the four cams 32 in a direction to force the disk 26 against the head of the drum, in which position it has a clutching action as a "servo" brake device, and turns a short distance in whichever direction the drum is turning. In whichever direction it turns, the surfaces 24 wedge the shoes 14 and 16 apart against the drum to apply the brake. When the brake is released, spring 20 causes rollers 22 to act on wedge surfaces 24 to turn disk 26 back to its central or initial position, while springs 30 move the disk axially away from the head of the drum.

While one illustrative embodiment has been described in detail, it is not my intention to limit the scope of the invention to that particular embodiment, or otherwise than by the terms of the appended claims. Most of the subject-matter herein claimed is to be regarded as divided from my co-pending application No. 625,072, filed March 14, 1923.

I claim:

1. A brake including a pair of relatively-rotatable members, one of which is movable axially into frictional engagement with the other, a pair of inter-connected parallel shafts behind the movable member, and a plurality of spaced member-moving devices mounted on each shaft.

2. A brake including a pair of relatively-rotatable members, one of which is movable axially into frictional engagement with the other, a pair of inter-connected parallel shafts behind the movable member, and a plurality of spaced cams on each shaft engaging the movable member.

3. A brake including a pair of relatively-rotatable members, one of which is movable axially into frictional engagement with the other, a rockshaft having a plurality of spaced cams engaging the back of the movable member, and brake shoes adapted to be actuated directly by the rotation of one of said members.

4. A brake comprising, in combination, a drum having a peripheral flange, a friction device engageable with the flange, and an angularly and axially-movable friction device inside of the drum having wedge surfaces, and the other friction device having parts engaging said surfaces in such a manner that angular movement of the axially-movable device forces the other device against the flange together with means for imparting axial movement to said second mentioned device comprising a plurality of angularly movable shaft supported members disconnectedly engaging said device.

5. Brake-applying means comprising parallel shafts each provided with a plurality of cams at spaced points on the shaft and with a pinion for turning the shaft, and an operating device including a pinion meshing with both of the pinions on the shafts.

6. Brake-applying means comprising parallel shafts each provided with a plurality of pressure devices at spaced points on the shaft and with a pinion for turning the shaft, and an operating device including a pinion meshing with both of the pinions on the shafts.

EUGÈNE PROSPER RENAUX.